United States Patent
Shirahama (10) Patent No.: US 8,221,022 B2
(45) Date of Patent: Jul. 17, 2012

(54) CELL MONITOR LOCKING MECHANISM FOR A FUEL CELL ASSEMBLY

(75) Inventor: Junichi Shirahama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 486 days.

(21) Appl. No.: 12/084,262

(22) PCT Filed: Mar. 6, 2007

(86) PCT No.: PCT/IB2007/000528
§ 371 (c)(1),
(2), (4) Date: Apr. 29, 2008

(87) PCT Pub. No.: WO2007/102071
PCT Pub. Date: Sep. 13, 2007

(65) Prior Publication Data
US 2009/0104503 A1    Apr. 23, 2009

(30) Foreign Application Priority Data
Mar. 7, 2006 (JP) .................................. 2006-060805

(51) Int. Cl.
*H01M 2/02* (2006.01)
(52) U.S. Cl. ......... 403/325; 403/321; 429/430; 429/468
(58) Field of Classification Search ............ 429/12, 429/34, 430, 468; 403/325, 321
See application file for complete search history.

(56) References Cited

U.S. PATENT DOCUMENTS

| | | | |
|---|---|---|---|
| 6,032,004 A * | 2/2000 | Mirabella et al. | 399/90 |
| 2004/0028969 A1* | 2/2004 | Aoto | 429/23 |
| 2005/0074655 A1* | 4/2005 | Ariyoshi et al. | 429/34 |
| 2005/0153192 A1 | 7/2005 | Nakagawa et al. | |
| 2005/0213409 A1 | 9/2005 | Wakahoi et al. | |
| 2006/0088377 A1* | 4/2006 | Rejman et al. | 403/331 |
| 2007/0154761 A1* | 7/2007 | Eun et al. | 429/32 |

FOREIGN PATENT DOCUMENTS

| | | |
|---|---|---|
| EP | 1 411 569 A2 | 4/2004 |
| JP | 11-339828 A | 12/1999 |
| JP | 2001-126747 A | 5/2001 |
| JP | 2001-256991 A | 9/2001 |
| JP | 2001-256992 A | 9/2001 |

(Continued)

OTHER PUBLICATIONS

Office Action issued Jan. 24, 2012 in JP 2006-060805 and English translation thereof.

*Primary Examiner* — Ula C Ruddock
*Assistant Examiner* — Frank Chernow
(74) *Attorney, Agent, or Firm* — Kenyon & Kenyon LLP (57) ABSTRACT

A fuel cell has at least one engaging portion that protrudes from an outer edge of a cell and engages with a cell monitor so as to restrict movement of the cell monitor away from the cell. The cell has a plurality of engaging portions that are spaced apart from each other, and the engaging portions engage with one cell monitor at a plurality of positions of the cell. Separators of the cell contact at major surfaces thereof with cell monitor terminals. One cell monitor is mounted on a plurality of cells, and the terminals of the cell monitor are electrically connected to the separators of the cells.

11 Claims, 5 Drawing Sheets

FOREIGN PATENT DOCUMENTS

| | | |
|---|---|---|
| JP | 2001-261991 A | 9/2001 |
| JP | 2002-313399 A | 10/2002 |
| JP | 2002-352821 A | 12/2002 |
| JP | 2003-115304 A | 4/2003 |
| JP | 2004-087163 A | 3/2004 |
| JP | 2004-127775 A | 4/2004 |
| WO | WO 02/15312 A1 | 2/2002 |
| WO | WO 2007/085922 A | 8/2007 |

* cited by examiner

CELL MONITOR LOCKING MECHANISM FOR A FUEL CELL ASSEMBLY

This is a 371 national phase application of PCT/IB2007/000528 filed 6 Mar. 2007, claiming priority to Japanese Patent Application No. 2006-060805 filed 7 Mar. 2006, the contents of which are incorporated herein by reference.

FIELD OF THE INVENTION

The invention relates to a fuel cell, and in particular to a fuel cell on which a cell monitor is removably mounted with improved efficiency and easiness.

BACKGROUND OF THE INVENTION

A unit cell of a fuel cell system includes a membrane electrode assembly (MEA) that is sandwiched by and between separators. When the separators are in the form of metal separators, a resin frame may be interposed between the MEA and each of the separators. Such unit cells are stacked together to form a fuel cell stack. A cell monitor for obtaining information about the fuel cell, for example, for measuring voltage, may be mounted on each cell (or unit cell) or a suitable number of cells of the fuel cell stack. JP-A-2001-256991 discloses a fuel cell in which a recess (terminal mounting hole) is formed in an edge portion of a separator, and a terminal of a cell monitor is inserted into the recess.

However, the fuel cell disclosed in the above-identified publication, in which the cell monitor is mounted on each unit cell, suffers from complexity and inefficiency with which the cell monitors are mounted on and demounted from the respective cells. Also, the separator in which the terminal mounting hole is formed needs to have a thickness larger than the diameter of the hole, and it is thus difficult to form the terminal mounting hole in a metal separator having a small thickness.

DISCLOSURE OF THE INVENTION

It is an object of the invention to provide a fuel cell on or from which a cell monitor or monitors can be mounted or demounted with improved efficiency and easiness.

A first aspect of the invention relates to a fuel cell having at least one engaging portion (e.g., claw(s)) that protrudes from an outer edge of a cell having separators and an intermediate body between the separators, and engages with a cell monitor so as to restrict movement of the cell monitor away from the cell. Each cell of the fuel cell may have a plurality of engaging portions that are spaced apart from each other, and the engaging portions may engage with one cell monitor at a plurality of positions of the cell. The cell monitor may have cell monitor terminals, and the separators of the fuel cell may contact at major surfaces thereof (perpendicular to the direction in which the cells are stacked together) with the cell monitor terminals. The engaging portion or portions may be formed on the intermediate body. For example, where the separators are metal separators, and the intermediate body is a resin frame, the engaging portion or portions is/are formed on the resin frame. One cell monitor may be mounted on two or more cells (e.g., five cells, but the number of cells is not limited to five) that are stacked together, and the terminals of the cell monitor may be electrically connected to the separators of the cells at different positions between adjacent ones of the cells. The above-indicted at least one engaging portion may be formed asymmetrically in the lateral or vertical direction of the cell, so as to provide a function of preventing erroneous assembling of each cell and erroneous stacking of the cells.

In the fuel cell of the invention in which the engaging portions protrude from outer edges of the cells, the mounting and positioning of the cell monitor on the cells are accomplished through engagement of the cell monitor with the engaging portions, thus assuring improved efficiency and easiness with which the cell monitor is mounted on or demounted from the cells. Once the cell monitor is mounted, the engaging portions engage with the cell monitor so as to restrict movement of the cell monitor away from the cells, thereby preventing the cell monitor from being detached from the cells. Also, in the case where the engaging portions engage with movable claws of the cell monitor, the cell monitor can be easily demounted from the cells by disengaging the movable claws from the engaging portions.

Furthermore, since the engaging portions are not in the form of recesses or holes, but protrude from the outer edge of the cell, a cell component that is formed with the engaging portions is not required to have as large a thickness as that required in the case where the engaging portions are in the form of holes. Thus, even where the cell component formed with the engaging portions is a resin frame used along with a metal separator, the engaging portions can be sufficiently formed on the resin frame.

In the case where each cell has two or more engaging portions that are spaced apart from each other (for example, where space is provided between L-shaped engaging portions), holders of the cell monitor can be inserted into the space between the engaging portions, and thus the cell monitor can be easily fixed and positioned while requiring only small space.

When the terminals of the cell monitor are in surface contact with the major surfaces (parallel to the cell plane) of the separators of the cells for conduction between the cell monitor and the cells, it is possible to provide a large area of contact between the terminals and the cells and reduced contact resistance, as compared with the case where the terminals of the cell monitor are in contact with end faces of thin separators.

In the case where the fuel cell has an intermediate body between the separators, and the engaging portions are formed on the intermediate body, for example, where the separators are metal separators, and the intermediate body is a resin frame, while the engaging portions are formed on the resin frame, the cell monitor can be more firmly held or supported on the cell as compared with the case where the metal separator is formed with engaging portions and the cell monitor engages with the metal separator, since the intermediate body (e.g., resin frame) has greater rigidity and strength than the metal separator.

In the case where one cell monitor is mounted on a plurality of cells (e.g., five cells, but the number of cells is not limited to five) that are stacked together, the efficiency with which cell monitors are mounted on the fuel cell stack is improved as compared with the case where each of the cell monitors is mounted on each of the cells of the stack. In the case where the terminals of the cell monitor contact with the separators of the cells at different positions between adjacent ones of the cells, for conduction between the cell monitor and the cells, space that permits each terminal to be attached to each cell can be surely provided even if each cell has a small thickness.

Also, if the engaging portions are formed asymmetrically in the lateral or vertical direction of the cell, erroneous mounting of the separators (placing the separators upside down or in the laterally opposite positions) during assembling of each cell or stacking of the cells can be easily prevented through visual checking.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF PREFERRED EMBODIMENTS

Referring to FIG. 1 through FIG. 8, a fuel cell according to one embodiment of the invention will be described. The fuel cell (which may also be called "cell") of this embodiment is, for example, a polymer electrolyte fuel cell 10.

Figure 7:
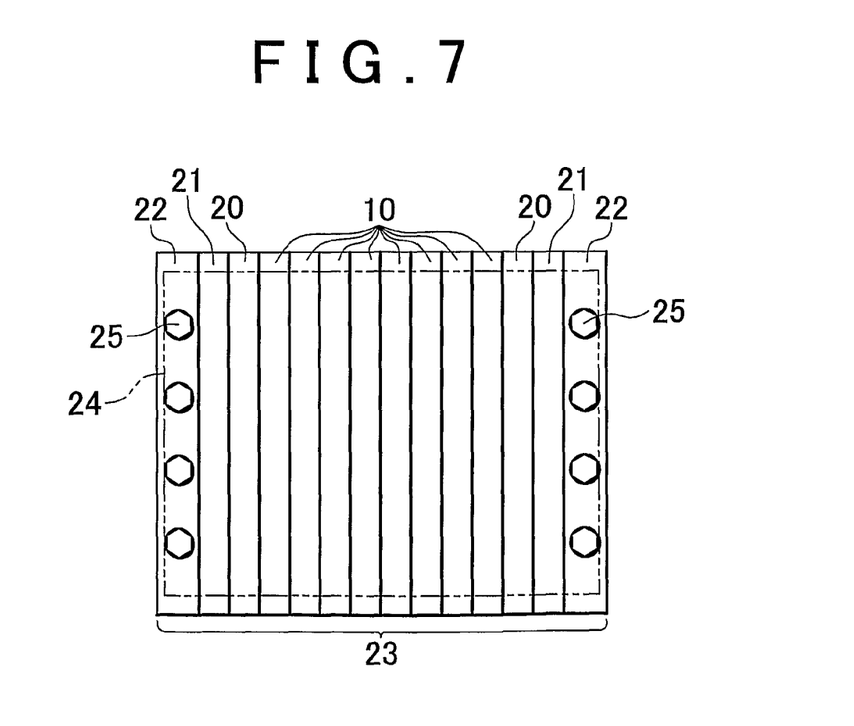
FIG. 7 is a schematic view showing a side face of a fuel cell stack that incorporates fuel cells of the embodiment of FIG. 1.
Figure 8:
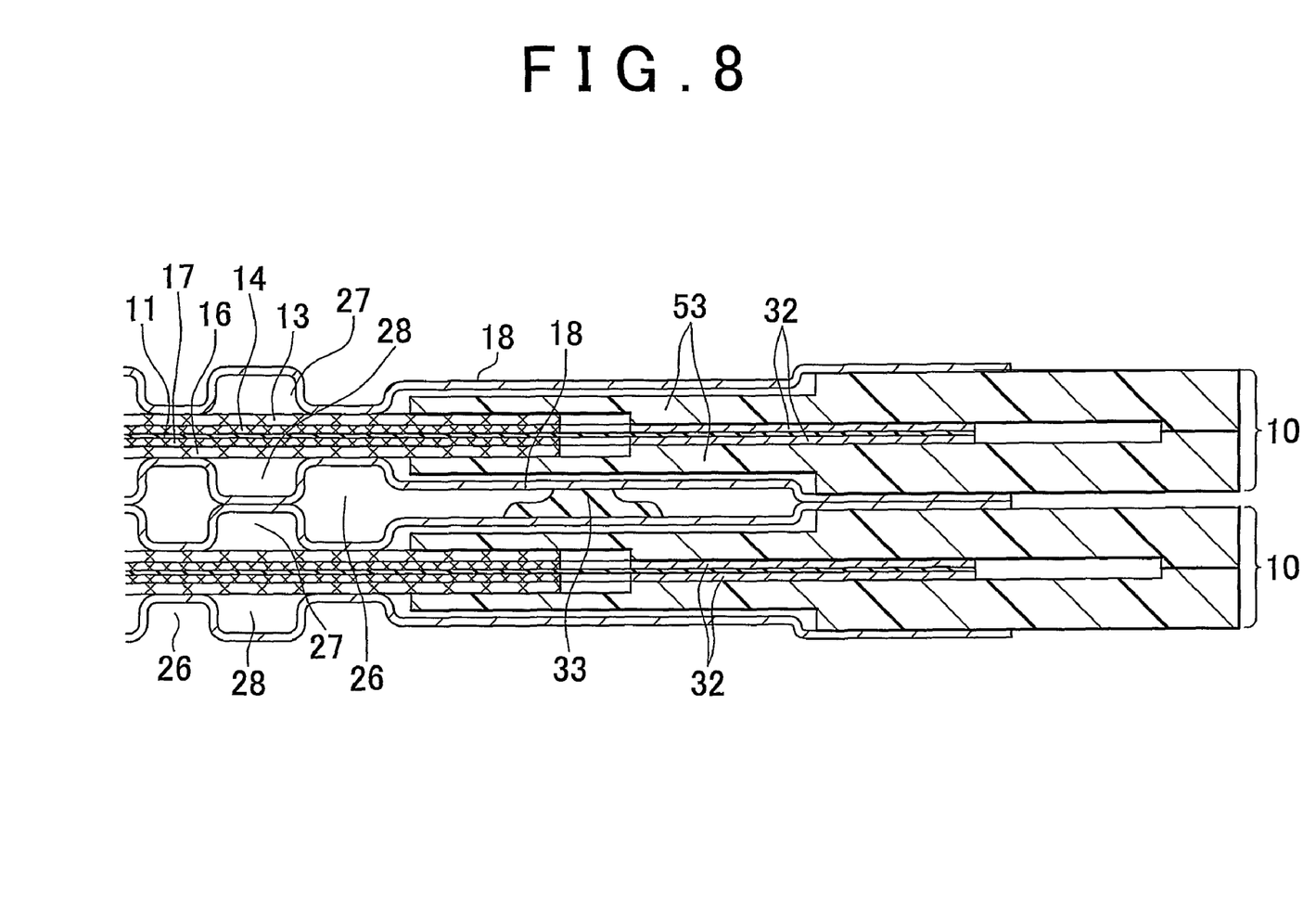
FIG. 8 is an enlarged, cross-sectional view of a part of the fuel cell stack of FIG. 7.

As shown in FIG. 8, the polymer electrolyte fuel cell 10 is formed from a laminated structure of a membrane electrode assembly (MEA) and separators 18. The membrane electrode assembly consists of an electrolyte membrane 11 serving as an ion exchange membrane, an electrode (anode, fuel electrode) 14 in the form of a catalyst layer disposed on one surface of the electrolyte membrane 11, and an electrode (cathode, air electrode) 17 in the form of a catalyst layer disposed on the other surface of the electrolyte membrane 11. Diffusion layers (which may also be called "gas diffusion layers") 13, 16 are provided between the membrane electrode assembly and the separator 18 on the side of the anode and between the membrane electrode assembly and the separator 18 on the side of the cathode. The membrane electrode assembly and the separators 18 are laminated or superimposed on each other to provide a cell 10. As shown in FIG. 7, a plurality of cells 10 are stacked together into a stacked structure or cell stack, and terminals 20, insulators 21 and end plates 22 are disposed at the opposite ends of the stacked structure in the direction in which the cells are stacked (this direction will be referred to as "stacking direction"). The end plates 22 are fixed with bolts and nuts 25 to a fastening member (such as a tension plate 24) that extends in the stacking direction, at the outside of the stacked structure of the cells, and a load is applied from the fastening member to the stacked structure in the stacking direction, so as to provide a fuel cell stack 23. The fuel cell stack 23 may be installed on, for example, a fuel cell vehicle. It is, however, to be understood that the fuel cell stack 23 may be used in applications other than vehicles, and may be used, for example, as a stationary fuel cell intended for home use.

Figure 1:
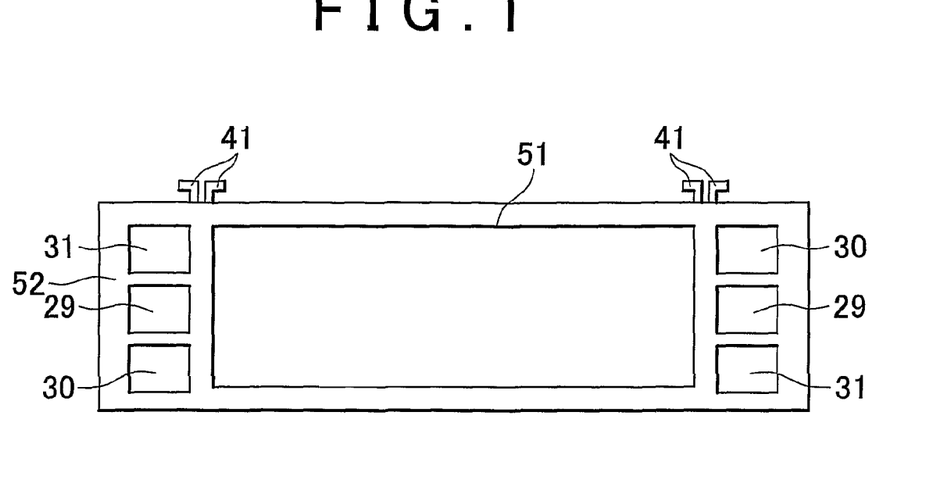
FIG. 1 is a schematic front view of a fuel cell constructed according to one embodiment of the invention.

As shown in FIG. 8, the separators 18 of each cell form a fuel gas channel 27 through which fuel gas (hydrogen) is supplied to the anode 14, and an oxidizing gas channel 28 through which oxidizing gas (oxygen, or, generally, air) is supplied to the cathode 17, such that these channels 27, 28 are located in a power generation region 51 (as shown in FIG. 1). Also, coolant channels 26 for feeding a coolant (generally, cooling water) are formed on the surfaces of the separators 18 opposite to the gas channels 27, 28. As shown in FIG. 1, fuel gas manifolds 30, oxidizing gas manifolds 31 and coolant manifolds 29 are formed in the separators 18 in a non-power-generation region 52. The fuel gas manifolds 30 communicate with the fuel gas channels 27 of the respective cells, and the oxidizing gas manifolds 31 communicate with the oxidizing gas channels 28, while the coolant manifolds 29 communicate with the coolant channels 26. Each of the separators 18 may be in the form of a carbon separator, or a metal separator (including a combination of a metal separator and a resin frame 53), or a conductive resin separator. In the case where the separator 18 is in the form of a metal separator, the metal separator 18 may be formed of a material, such as stainless steel, aluminum or its alloy, titanium or its alloy, or magnesium or its alloy. The resin frame 53 is a frame made of a thermosetting resin.

In operation, an ionization reaction for converting hydrogen into hydrogen ions (or protons) and electrons occurs at the anode 14 of each cell 10, and the hydrogen ions move to the cathode 17 through the electrolyte membrane 11, and combine with oxygen and electrons to produce water at the cathode 17, thereby generating electricity according to the following expressions. The electrons used for producing water at the cathode 17 may be produced at the anode of an adjacent MEA and flow to the cathode 17 through the separators, or may be produced at the anode of the cell at one end of the stack in the stacking direction and flow to the cathode of the cell at the other end through an external circuit.

At the Anode: $H_2 \rightarrow 2H^+ + 2e^-$

At the Cathode: $2H^+ + 2e^- + (½)O_2 \rightarrow H_2O$

Various fluids (fuel gas, oxidizing gas and a coolant) are sealed from one another and from the outside. First seal members 32 provide seal between two separators 18 that sandwich the MEA of each cell 10, and second seal members 33 provide seal between adjacent ones of the cells 10. Where the separators are metal separators, resin frames 53 (frame made of a resin and having manifolds and a middle opening that extends over the power generation region 51) may be interposed between the metal separators 18 and the electrolyte membrane 11 in the non-power-generation region 52. In this case, the first seal members 32 provide seal between the metal separators 18 and the resin frames 53 and seal between the resin frames 53 and the electrolyte membrane 11. The first seal member 32 is formed of, for example, an adhesive for sealing (or sealing adhesive), and the second seal member 33 is formed of, for example, a rubber seal material, such as silicone rubber, fluororubber, or EPDM (ethylene propylene dien rubber). It is, however, to be understood that the first seal member 32 and the second seal member 33 may be both formed of an adhesive for sealing or a rubber sealing material.

As shown in FIG. 2 through FIG. 5, cell monitors 60 for detecting cell information (such as cell voltage, cell temperature or other information) are mounted on the cells 10 of the fuel cell stack 23, such that the cell monitors 60 can be attached to or detached from engaging portions 41 of the cells 10.

Each cell 10 has an intermediate body between a pair of separators 18 (No. 1 separator and No. 2 separator), and the intermediate body is formed with the engaging portions 41. In this embodiment in which the cell 10 has the metal separators 18 and the resin frames 53, the resin frames 53 are regarded as the intermediate body, and the engaging portions 41 of the cell 10 are formed on the resin frame 53.

The engaging portions 41 of the cell 10 engage with the cell monitor 60 so as to hold the cell monitor 60 in position. The engaging portions 41 of the cell 10 protrude outwards from an edge of one side of the outline of the cell 10, for engagement with the cell monitor 60, so as to restrict movement of the cell monitor 60 away from the cell 10. For example, each of the engaging portions 41 of the cell 10 is in the form of an L-shaped claw that protrudes outwards from an edge of one side of the outline of the cell 10, and bends at its distal end portion to extend in a direction parallel to the outer edge of the cell 10, as shown in FIG. 1. When engaging with movable claws 63 of the cell monitor 60, the engaging portions 41 restrict movement of the cell monitor 60 away from the cell 10.

Figure 2:
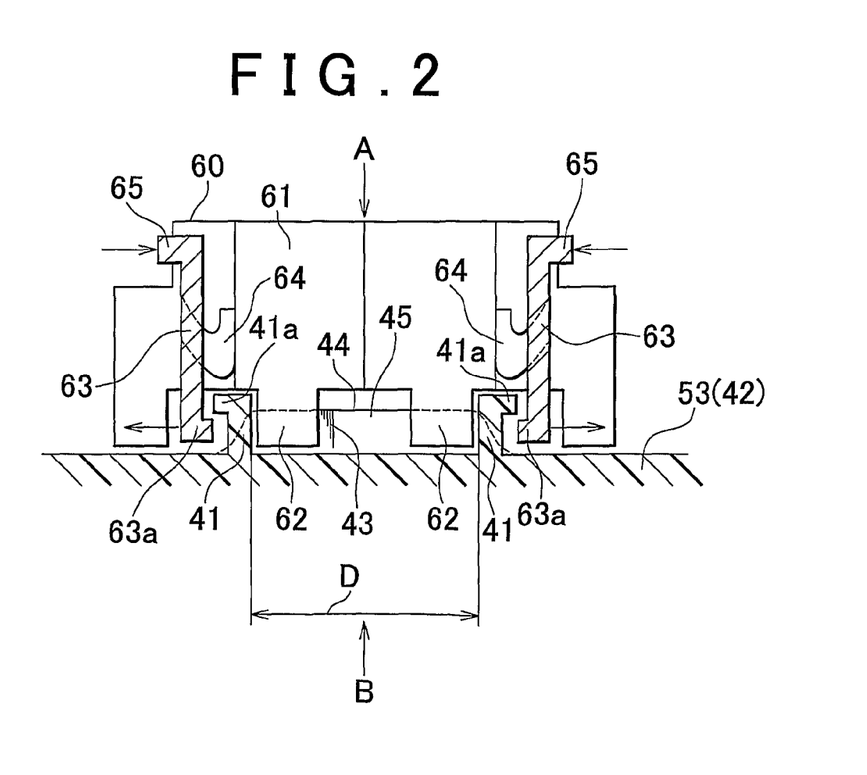
FIG. 2 is a schematic cross-sectional view of a part of the fuel cell of FIG. 1 which includes a cell monitor mounting portion and its vicinity.
Figure 5:
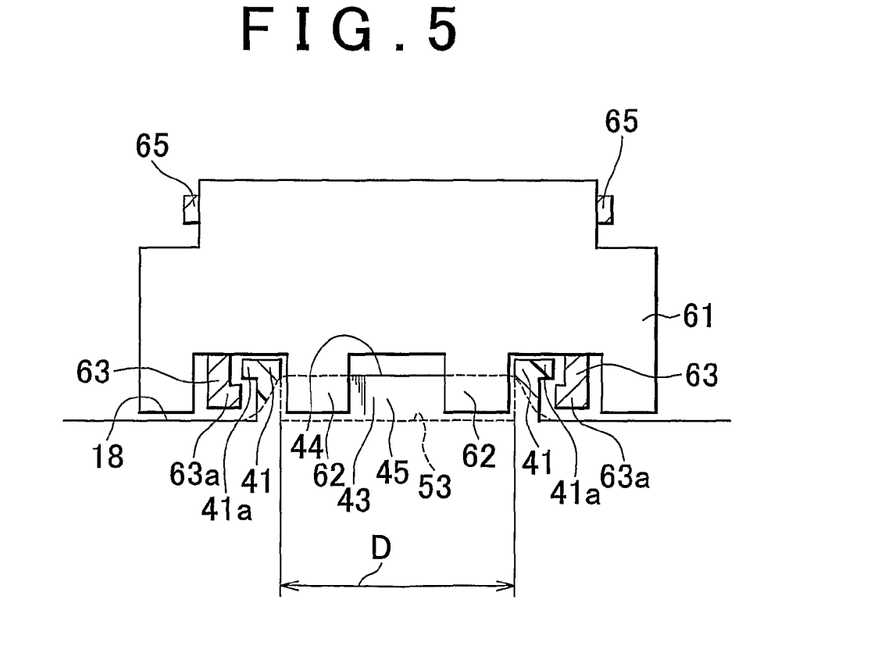
FIG. 5 is a view taken along line V-V in FIG. 4.

One of the above-mentioned pair of separators 18 (No. 1 separator and No. 2 separator) of the fuel cell 10 has a separator protrusion 45 that is formed at a portion of the separator 18 on which the cell monitor 60 is mounted and protrudes outwards from the outline of the cell 10, as shown in FIG. 2 and FIG. 5. The other separator 18 has no protrusion.

Figure 6:
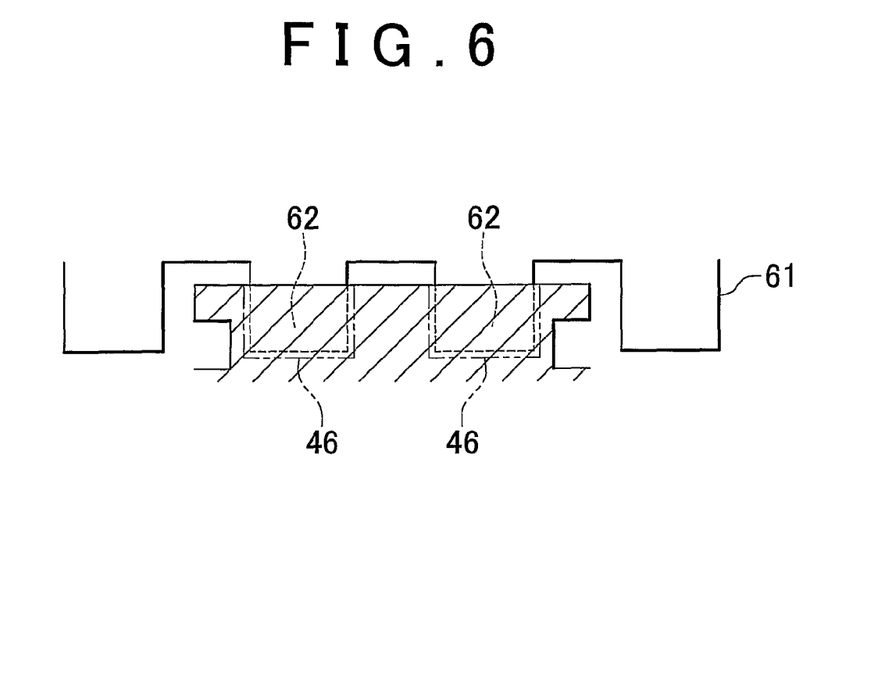
FIG. 6 is a schematic view of a modified example of the fuel cell in which two L-shaped engaging portions of FIG. 5 are replaced with a single T-shaped engaging portion.

As shown in FIG. 2 and FIG. 5, a pair of resin frames 53 as the intermediate body between the pair of separators 18 (No. 1 separator and No. 2 separator) have no protrusions like the protrusion 45 of one of the separators 18, at their positions corresponding to the protrusion 45 of the above-indicated one separator 18. This arrangement makes it possible to insert separator holders 62 of the cell monitor 60 between the separator protrusions 45 of adjacent ones of the cells. In a modified example, the pair of resin frames 53 may be formed with protrusions like the protrusions 45 of the above-indicated one separator 18. In this case, the resin frames 53 are formed with grooves or recesses 46 (as shown in FIG. 6) that receive the separator holders 62 of the cell monitor 60 without interfering with the holders 62.

Figure 3:
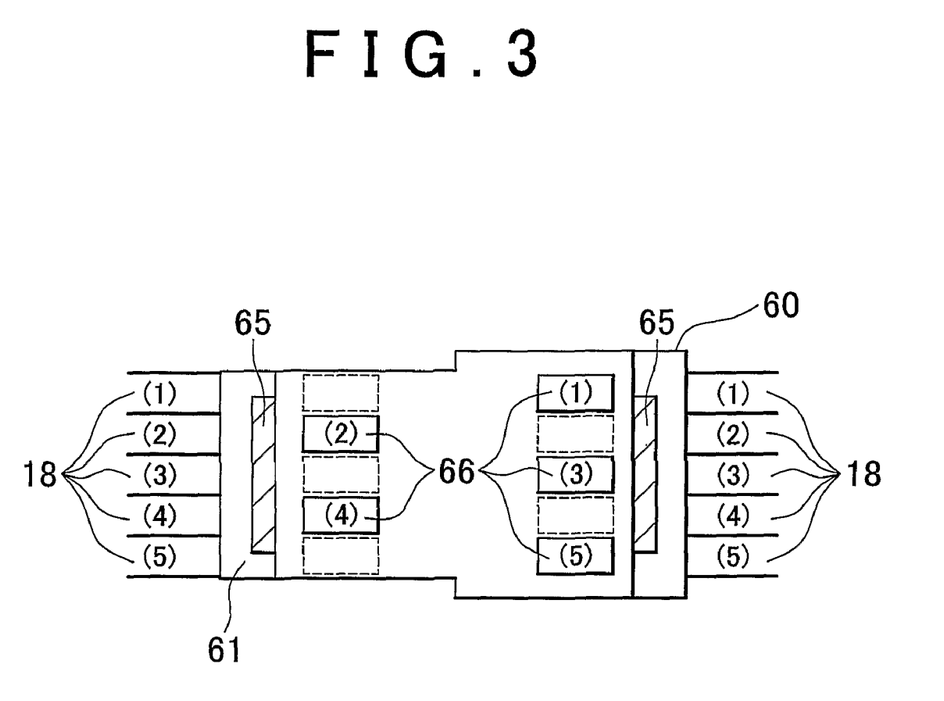
FIG. 3 is a view of the fuel cell as viewed in the direction of arrow A in FIG. 2.

As shown in FIG. 2, the cell monitor 60 has a resin housing 61, and separator holders 62 that are formed integrally with the resin housing 61 and protrude toward the cells 10 to extend in parallel with major surfaces 43 of the separator protrusions 45. The cell monitor 60 also has electrode sensing portions (cell monitor terminals) 66 (as shown in FIG. 3) formed on the surfaces of the separator holders 62 which are opposed to the separator protrusions 45, and movable claws 63 that are movable relative to the housing 61 and can engage with the engaging portions 41 of the cells 10. The movable claws 63 are urged by springs 64 in such directions as to engage with the engaging portions 41. The movable claws 63 are formed with buttons 65 that project from the housing 61. When the buttons 65 are pushed, the movable claws 63 are moved against the bias force of the springs 64 to pivot about the springs 64, in such directions in which distal bent portions 63a of the movable claws 63 are disengaged from the engaging portions 41.

Figure 4:
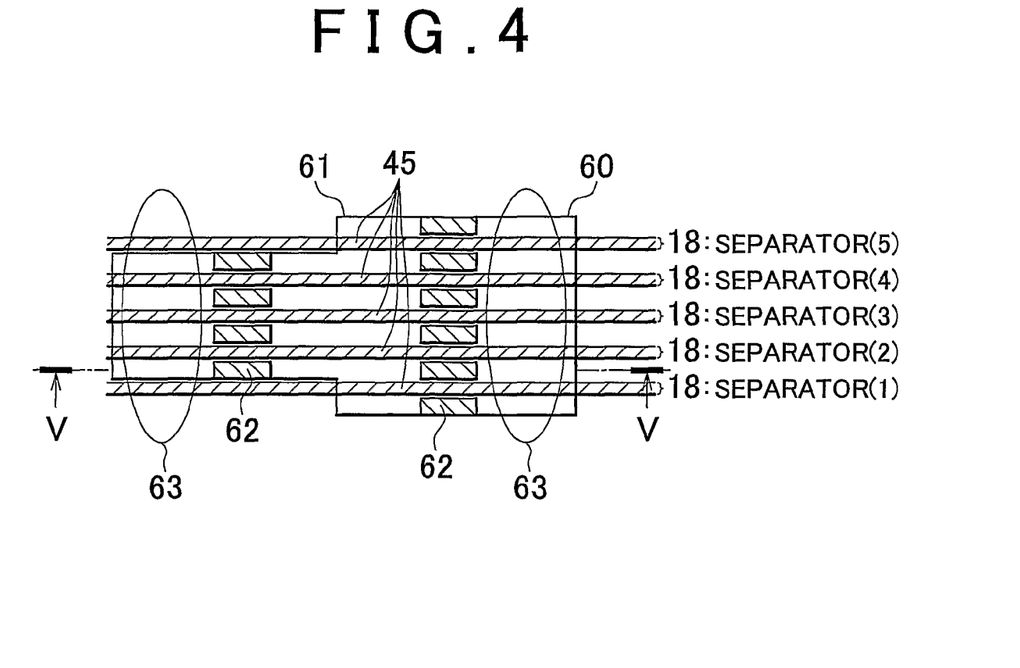
FIG. 4 is a view of the fuel cell as viewed in the direction of arrow B in FIG. 2.

As shown in FIG. 4, one cell monitor 60 monitors information about a plurality of cells 10. In the case where one cell monitor 60 monitors information about five cells 10 (the number of the cells is not limited to five), for example, one cell monitor 60 has one housing 61 and ten separator holders 62 (two holders for each cell). Paired separator holders 62 of the cell monitor 60 are provided so as to be positioned at the ends of the protrusion 45, and the protrusion 45 of the one separator 18 of the cell 10 is interposed between the pairs of separator holders 62 with clearances formed between the protrusion 45 and the respective holders 62. Terminals (electrode sensing portions) 66 are formed on surfaces of the separator holders 62 which are opposed to the protrusion 45 of the above-indicated one separator 18, such that the terminals 66 are in contact with the one separator 18 for conduction.

The cell 10 has two or more engaging portions 41 that are spaced apart from each other in a certain direction in the cell plane, and the engaging portions 41 engage at two or more locations with two or more movable claws 63 of one cell monitor 60. In FIG. 5, each cell 10 has two L-shaped engaging portions 41 (right and left engaging portions 410) that are spaced by distance D from each other in the cell plane. The two L-shaped engaging portions 41 have distal end portions 41a that extend from their right-angled parts in directions parallel to an edge of one side of the outline of the cell 10, such that the portions 41a point in the opposite directions to each other. The distal end portions 41a engage with the distal bent portions 63a of the movable claws 63 of the cell monitor 60 so as to restrict movement of the cell monitor 60 away from the cell 10. The separator holders 62 of the cell monitor 60 are inserted in the space D between the two L-shaped engaging portions 41. In the presence of the space D between the two L-shaped engaging portions 41, the separator holders 62 of the cell monitor 60 can be inserted into the space D without interfering with a portion of the resin frame 53 located between the engaging portions 41. If the engaging portions 41 are formed in the shape of the letter T, namely, are replaced with a single T-shaped engaging portion, the separator holders 62 of the cell monitor 60 interfere with the engaging portion, and, therefore, grooves (grooves 46 indicated by two-dot chain lines) must be formed in the interfering portions, as shown in FIG. 6. In this case, the grooves 46 are exposed to the protrusion 45 of the separator 18, so that the terminals 66 formed on the separator holders 62 contact with the protrusion 45.

The cell monitor 60 has cell monitor terminals (electrode sensing portions) 66 formed on the surfaces of the separator holders 62 which are opposed to the separators, and the cell monitor terminals 66 contact with the major surfaces 43 (parallel to the cell plane) of the separators 18 to be thus able to measure information (such as voltage) of the separators. The area of contact of each terminal 66 with the major surface 43 of each separator 18 is larger than that of contact of the terminal 66 with an end face 44 (FIG. 5) of the separator.

As shown in FIG. 3 and FIG. 4, in the fuel cell stack 23, one cell monitor 60 is mounted with respect to a plurality of cells 10 (for example, five cells, but the number of cells for each cell monitor is not limited to five) that are stacked together. A plurality of terminals 66 of one cell monitor 60 contact with the protrusions 45 of the separators 18 of the cells 10 at alternate positions as indicated by (1) through (5) in FIG. 3 (i.e., positions that are offset from each other in a direction parallel to the cell plate), so that the separators 18 are brought into conduction with the cell monitor 60. Namely, the terminals 66 are alternately arranged in two rows in the cell stacking direction such that the terminals 66 connected to adjacent ones of the cells 10 are located in different rows. The alternate arrangement is employed because each cell 10 has a small thickness, and the separator holders 62 for adjacent cells need to be prevented from interfering with the protrusion 45.

The engaging portions 41 of the cell 10 are formed at asymmetrical positions in the lateral and vertical directions. For example, when the engaging portions 41 are formed asymmetrically in the vertical direction, only one of the upper and lower resin frames 53 is formed with a pair of engaging portions 41. When the engaging portions 41 are formed asymmetrically in the lateral direction, one of right and left engaging portions 41 is formed on the one of the upper and lower resin frames 53, and the other engaging portion 41 is formed on the other resin frame 53. The asymmetrical arrangement of the engaging portions in the lateral or vertical direction provides a function of preventing each cell from being erroneously assembled together and preventing the cells from being erroneously stacked together. For example, if one of the cells 10 is erroneously oriented to place the engaging portions 41 upside down during stacking of the cells 10 into a cell stack, the engaging portions 41 of the erroneously oriented cell 10 appear on the side opposite to the side on which the engaging portions of the correctly oriented cells appear, whereby the error can be immediately found out through visual checking.

Next, the operation and effects of the fuel cell according to the present embodiment will be explained.

The cells 10 are stacked into the stack 23. The cell monitor 60 is mounted on each cell 10 or two or more cells, for monitoring information about the cell(s) 10. The information is transmitted to a computer for computing, and the operation of the cells 10 are controlled based on the computing results. The mounting of the cell monitor 60 on the two or more cells 10 is carried out by pushing the buttons 65 of the cell monitor 60 with a hand so as to move the movable claws 63 away from each other, inserting the cell monitor 60 to a sufficient depth until the movable claws 63 can engage with the engaging portions 41 of the cells 10, and releasing the hand from the buttons 65 so that the movable claws 63 return to their original positions under the spring force of the springs 64 for engagement with the engaging portions 41 of the cells 10. When the movable claws 63 engage with the engaging portions 41 of the cells 10, each of the separator protrusions 45 is interposed between the corresponding separator holders 62 with clearances formed therebetween, and the terminals (electrode sensing portions) 66 formed on the separator holders 62 are brought into surface contact with the protrusion 45 of the separator 18 for conduction. In this manner, the cell monitor 60 is positioned relative to the cell stack 23.

In the fuel cell of this embodiment in which the engaging portions 41 protrude outwards from outer edges of the cells, the cell monitor 60 can be mounted on and positioned relative to the cells 10 by engaging the cell monitor 60 with the engaging portions 41 and sandwiching the separator protrusions 45 by and between the separator holders 62. Since one cell monitor 60 contacts with the separators 18 of two or more cells for conduction, the cell monitor 60 can be mounted on the cells 10 with improved efficiency and easiness, as compared with the case where the cell monitor is mounted on each cell 10. Once the cell monitor 60 is mounted on the cells 10, the engaging portions 41 engage with the cell monitor 60 so as to restrict movement of the cell monitor 60 away from the cells 10, thereby preventing the cell monitor 60 from being detached from the cells 10. Also, the cell monitor 60 can be easily demounted from the cells 10 by disengaging the movable claws 63 from the engaging portions 41. Furthermore, the engaging portions 41 are in the form of protrusions, rather than recesses or holes, cell components (e.g., resin frames 53) formed with the engaging portions 41 need not have a thickness large enough to permit holes to be formed therein. Thus, even in the case where the cell components (e.g., resin frames 53) formed with the engaging portions 41 are resin frames that are used along with metal separators, it is possible to form engaging portions without reducing the rigidity and strength of the cell components (e.g., resin frames 53).

In the case where each fuel cell 10 has two or more engaging portions that are spaced by distance D from each other, space that permits insertion of the separator holders 62 of the cell monitor 60 is provided between the engaging portions 41, and, therefore, the cell monitor 60 can be easily fixed and positioned while requiring only small space. Namely, the cell monitor 60 can be positioned relative to the stack 23 in the stacking direction of the cells through engagement of the separator holders 62 of the cell monitor 60 with the separator protrusions 45 in the cell stacking direction, and the cell monitor 60 can be positioned in the cell plane through engagement of the engaging portions 41 of the cells with the cell monitor 60.

In the case where the major surfaces 43 of the engaging portions 41 of the cells 10 are in surface contact with the terminals (electrode sensing portions) 66 of the cell monitor 60 for conduction between the cells 10 and the cell monitor 60, the area of contact can be made larger than that in the case where the end faces 44 of the separators having a small thickness are in contact with the terminals of the cell monitor, and, therefore, contact resistance can be reduced.

In the case where the fuel cell 10 has an intermediate body between a pair of separators, and the engaging portions 41 are formed on the intermediate body, for example, where the separators 18 comprise metal separators and the intermediate body comprises resin frames 53 while the engaging portions 41 are formed on the resin frame 53, as in the present embodiment, the cell monitor 60 can be more firmly held in position as compared with the case where the cell monitor 60 is held or supported by the metal separators 18 since the intermediate body (e.g., resin frames 53) has greater rigidity and strength than the metal separators 18.

In the case where one cell monitor 60 is mounted on a plurality of cells 10 (e.g., five cells, but the number of cells is not limited to five) that are stacked together, the efficiency of the mounting of cell monitors on the cell stack is improved as compared with the case where each cell monitor 60 is mounted on each cell 10. If one cell monitor 60 is mounted on five cells 10, for example, mounting of only one cell monitor 60 accomplishes mounting of the cell monitor on the five cells 10. In the case where the terminals (electrode sensing portions) 66 of the cell monitor 60 are electrically connected to the separators 18 of the cells 10 in the stack 23 at different positions between adjacent cells 10 (for example, at positions that are alternately arranged in two rows), each terminal (electrode sensing portion) 66 can be surely attached to each cell even if the cell 10 has a small thickness. Also, if the engaging portions 41 are formed asymmetrically in the lateral or vertical direction of the cell, erroneous mounting of the separators during assembling of each cell and stacking of the cells can be easily prevented through visual checking.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A fuel cell assembly comprising:
   a fuel cell having separators and an intermediate body between the separators; and
   a cell monitor having first and second cell monitor claws,
   wherein the cell includes at least one engaging portion that protrudes from an outer edge of the cell and engages with the cell monitor so as to restrict movement of the cell monitor away from the cell, the cell monitor being insertable into the at least one engaging portion in a direction toward the cell, and the at least one engaging portion includes:
- a first claw that protrudes outwards from an edge of one side of the outline of the cell, and bends at a first distal end portion of the first claw to extend in a direction parallel to the outer edge of the cell; and
- a second claw that protrudes outwards from an edge of one side of the outline of the cell, and bends at a second distal end portion of the second claw to extend in a direction parallel to the outer edge of the cell, the second distal end portion extending in an opposite direction to the first distal end portion, wherein the cell monitor claws are movable along the outer edge of the cell, and the cell monitor claws are connected to the first and second claws of the fuel cell, and wherein a part of the cell monitor is provided between the first and second claws.

2. A fuel cell assembly according to claim 1, wherein:
the cell monitor has a cell monitor terminal; and
the separator contacts at a major surface thereof with the cell monitor terminal, the major surface extending in parallel with a plane of the cell.

3. A fuel cell assembly according to claim 1, wherein each of the at least one engaging portion is formed on the intermediate body.

4. A fuel cell assembly according to claim 3, wherein:
the separators comprise metal separators;
the intermediate body comprises a resin frame; and
each of the at least one engaging portion is formed on the resin frame.

5. A fuel cell assembly according to claim 1, wherein:
one cell monitor is mounted on a plurality of cells that are stacked together; and
terminals of the cell monitor are electrically connected to the separators of the cells at different positions between adjacent ones of the cells.

6. A fuel cell assembly according to claim 1, wherein the at least one engaging portion is formed asymmetrically in the lateral or vertical direction of the cell, so as to provide a function of preventing erroneous assembling of each cell and erroneous stacking of the cells.

7. A fuel cell assembly according to claim 1, wherein:
the separator includes a separator protrusion that contacts a terminal of the cell monitor when the at least one engaging portion engages with the cell monitor, and
the terminal of the cell monitor is provided between the first claw and the second claw when the at least one engaging portion engages with the cell monitor.

8. A fuel cell assembly according to claim 1, wherein:
the cell monitor further has first and second springs, and the first and second cell monitor claws are urged by the first and second springs to engage the first and second claws of the fuel cell respectively.

9. A fuel cell assembly according to claim 8, wherein:
the cell monitor further has first and second buttons projecting from a housing of the cell monitor, the first and second buttons when pressed cause the first and second springs to bias the movable claws to pivot about the springs and to disengage the movable claws from the first and second claws of the fuel cell.

10. A fuel cell assembly according to claim 1, wherein:
the part is at least a pair of separator holders.

11. A fuel cell assembly according to claim 10, wherein:
the at least a pair of separator holders are formed integrally with the housing of the cell monitor and are spaced apart to abut the first and second claws protruded from the fuel cell respectively.

* * * * *